(12) United States Patent  (10) Patent No.: US 8,114,922 B2
Fukuda et al.  (45) Date of Patent: Feb. 14, 2012

(54) INK AND LAMINATED SHEET

(75) Inventors: Masanobu Fukuda, Okegawa (JP);
Tatsuya Kouyama, Toda (JP); Jun Takahashi, Tokyo (JP); Kenkichi Yano, Tokyo (JP)

(73) Assignee: DIC Corporation, Tokyo (JP)

( * ) Notice: Subject to any disclaimer, the term of this patent is extended or adjusted under 35 U.S.C. 154(b) by 1079 days.

(21) Appl. No.: 10/583,714

(22) PCT Filed: Dec. 25, 2003

(86) PCT No.: PCT/JP03/16814
§ 371 (c)(1),
(2), (4) Date: Jun. 20, 2006

(87) PCT Pub. No.: WO2005/063901
PCT Pub. Date: Jul. 14, 2005

(65) Prior Publication Data
US 2009/0220755 A1  Sep. 3, 2009

(51) Int. Cl.
C09D 11/00 (2006.01)
C08G 59/50 (2006.01)
C08G 18/28 (2006.01)
B44D 3/18 (2006.01)
C08F 214/06 (2006.01)
C04B 24/26 (2006.01)
B60C 1/00 (2006.01)
C08K 3/08 (2006.01)
B41M 5/00 (2006.01)
B32B 9/04 (2006.01)

(52) U.S. Cl. ........ 523/160; 524/590; 524/601; 524/568; 524/567; 524/556; 524/563; 524/570; 524/439; 523/400; 428/195.1; 428/411.1

(58) Field of Classification Search .................. 523/160, 523/161, 400; 524/590, 601, 568, 567, 556, 524/563, 570, 439; 428/195, 1, 411.1
See application file for complete search history.

(56) References Cited

U.S. PATENT DOCUMENTS

| 3,849,150 | A | * | 11/1974 | Schrempp et al. | 106/410 |
| 5,133,805 | A | * | 7/1992 | Kurata et al. | 106/456 |
| 5,549,739 | A | * | 8/1996 | Inoue et al. | 106/15.05 |
| 5,672,410 | A | * | 9/1997 | Miekka et al. | 428/148 |
| 6,111,044 | A | * | 8/2000 | Yamamoto et al. | 526/266 |
| 6,476,096 | B1 | * | 11/2002 | Molloy et al. | 523/160 |
| 6,503,965 | B1 | * | 1/2003 | Nowak et al. | 523/161 |
| 6,616,741 | B1 | * | 9/2003 | Sawa et al. | 106/31.68 |
| 2003/0151028 | A1 | | 8/2003 | Lawrence et al. | |

FOREIGN PATENT DOCUMENTS

| EP | 1080810 | | 3/2001 |
| EP | 1186638 | | 3/2002 |
| EP | 1621586 | | 2/2006 |
| JP | 60-51758 | | 3/1985 |
| JP | 8-111991 | | 5/1993 |
| JP | 2001-26730 | | 1/2001 |
| JP | 2001-40263 | | 2/2001 |
| JP | 2001-139892 | | 5/2001 |
| JP | 2002-46230 | | 2/2002 |
| JP | 2003-342509 | | 12/2003 |
| JP | 2004-35848 | * | 2/2004 |
| JP | 2004-35849 | * | 2/2004 |
| JP | 2004-35949 | | 2/2004 |

OTHER PUBLICATIONS

Leach et al, "The Printing Ink Manual, 5th Edition", Blue Print, New York pp. 234-236 (1993).*

* cited by examiner

Primary Examiner — Basia Ridley
Assistant Examiner — Alexander Kollias
(74) Attorney, Agent, or Firm — Edwards Wildman Palmer LLP

(57) ABSTRACT

An ink comprises metal thin film fragments having an average thickness of 0.01 to 0.1 μm and an average particle diameter of 5 to 25 μm, and a binder resin having at least one selected from the group consisting of a carboxyl group, a phosphoric acid group, a sulfonic acid group, metal salts thereof and an amino group. A laminated sheet comprises multilaminated at least two synthetic resin films for molding, and a decorative layer having mirror-like metallic luster formed at any laminate interface of the synthetic resin films, the decorative layer being an ink film made of the ink, the ink film having a thickness of 0.05 to 2.0 μm.

24 Claims, No Drawings

US 8,114,922 B2

INK AND LAMINATED SHEET

TECHNICAL FIELD

The present invention relates to an ink and a laminated sheet.

BACKGROUND ART

Conventionally, coating of molded members which are molded by injection molding and the like has been conducted from the view point of improving design properties and surface protection, by a method wherein molded members is spray-coated and then crosslink of the resulting coated molded article is conducted through baking. However, in view of protection of working environment and protection of external environment against discharge of a volatile organic solvent, trials of eliminating a solvent such as a method which conducts a powder coating or the like have been made. Furthermore, there is introduced a method of laminating a colored sheet with a moldable resin, followed by integral molding.

As a laminated sheet having high-brightness mirror-like metallic luster, for example, there is known a laminated sheet obtained by dry lamination of an aluminum vapor-deposited polyethylene terephthalate film or polypropylene film. Japanese Unexamined Patent Application, First Publication No. Hei 5-111991 describes a laminated sheet comprising a dried and cured film layer of an acrylate-based emulsion which contains scaly aluminum particles having smooth surface.

These sheets originally have high-brightness mirror-like metallic luster. However, since the vapor-deposited surface has insufficient malleability and an ink layer is provided as a surface layer, when subjected to molding such as vacuum molding or in-mold molding, unevenness of luster arises after molding, luster decreases and the like, and thus mirror-like metallic luster was insufficient for molding.

Japanese Unexamined Patent Application, First Publication No. 2002-46230 proposes the use of a laminated sheet comprising an ink film formed with an ink obtained by dispersing metal thin film fragments in a binder resin varnish. According to this method, malleability and luster unevenness can be improved to some extent. However, although the laminated sheet can maintain apparent luster against molding, the binder resin included in a high-brightness ink used has not a functional group such as carboxyl group. Therefore, because of insufficient adhesion between very thin scaly metal thin film fragments and the binder resin, peeling tends to occur at the interface between the binder resin and the metal thin film fragments. Consequently, this laminated sheet has such a disadvantage that the ink layer is likely to cause peeling due to cohesion.

Therefore, for the purpose of improving adhesion between the binder resin and the surface of the pigment, the surface of the pigment has been subjected to a silane coupling treatment and an adhesion modifier comprising a low molecular material having a polar functional group such as carboxylic acid group or amino group has been mixed into the ink. However, sufficient effect was not exerted.

Therefore, a first object of the present invention is to provide a high-brightness ink which imparts high-brightness mirror-like metallic luster to the printed surface and can achieve high adhesion between metal thin film fragments and a binder resin. A second object of the present invention is to provide a laminated sheet which has high-brightness mirror-like metallic luster of the high-brightness ink film layer and also has excellent formability (malleability) enough to cause less decrease in luster against molding.

DISCLOSURE OF THE INVENTION

The present invention relates to an ink comprising: metal thin film fragments having an average thickness of 0.01 to 0.1 μm and an average particle diameter of 5 to 25 μm; and a binder resin having at least one selected from the group consisting of a carboxyl group, a phosphoric acid group, a sulfonic acid group, metal salts thereof and an amino group.

The present invention relates to a laminated sheet comprising: multilaminated at least two synthetic resin films for molding; and a decorative layer having mirror-like metallic luster formed at any laminate interface of the synthetic resin films, the decorative layer is an ink film made of an ink comprising metal thin film fragments having an average thickness of 0.01 to 0.1 μm and an average particle diameter of 5 to 25 μm, and a binder resin having at least one selected from the group consisting of a carboxyl group, a phosphoric acid group, a sulfonic acid group, metal salts thereof and an amino group, and the ink film having a thickness of 0.05 to 2.0 μm.

The present invention provides a high-brightness ink which imparts high-brightness mirror-like metallic luster to the surface printed with the ink and also achieves excellent adhesion between metal thin film fragments and a binder resin, and provides a laminated sheet having sufficient malleability required during molding.

BEST MODE FOR CARRYING OUT THE INVENTION

The present invention relates to a high-brightness ink which imparts high-brightness mirror-like metallic luster to the printed surface, and to a laminated sheet having high-brightness mirror-like metallic luster which is obtained by using the ink, particularly to a laminated sheet for molding, which requires no exterior coating, useful as a sheet for car related members, building members, household electric appliances and the like.

The present inventors have intensively studied a high-brightness ink containing metal thin film fragments and a binder resin so as to achieve the above objects and found that adhesion between metal thin film fragments and a binder resin was noticeably improved by using a binder resin having a specific functional group in combination with metal thin film fragments having a specific shape. They also have found that a laminated sheet comprising a film layer, which is obtained from the high-brightness ink, has both of excellent malleability and high-brightness mirror-like metallic luster, and thus above objects have been achieved and the present invention has been completed.

1. Ink

The ink of the present invention is a high-brightness ink comprising a binder resin varnish and metal thin film fragments dispersed in the binder resin varnish, which exhibits high-brightness mirror-like metallic luster. The content of the metal thin film fragments is preferably within a range from 10 to 60% by mass, and more preferably from 20 to 45% by mass, based on a non-volatile component in the ink. A metal powder has been usually used in a metallic ink. However, when metal thin film fragments are used, the metal thin film fragments can be oriented in the direction parallel to the surface of an article to be coated when printing or coating is conducted using the ink, and thus high-brightness mirror-like metallic luster, which has never been obtained by using a conventional metal powder, can be obtained.

(Metal Thin Film Fragments)

Examples of metal of metal thin film fragments used in the high-brightness ink of the present invention include aluminum, gold, silver, copper, brass, titanium, chromium, nickel, nickelchromium and stainless steel. Examples of the method of forming metal into a thin film includes a deposition method usable for metal having a low melting point such as aluminum, a malleation method usable for metal having malleability such as gold, silver or copper, and a sputtering method usable for metal which has a high melting point and has no malleability. Among these, metal thin film fragments obtained from the vapor-deposited metal thin film are preferably used. The thickness of the metal thin film is within a range from 0.01 to 0.1 μm, preferably from 0.02 to 0.08 μm, and more preferably from 0.02 to 0.045 μm. The average particle diameter of the metal thin film fragments to be dispersed in the ink is within a range from 5 to 25 μm, and preferably from 10 to 15 μm. When the average particle diameter is less than 5 μm, the resulting coating film has insufficient luster. On the other hand, when the average particle diameter exceeds 25 μm, it becomes difficult to orient the metal thin film fragments and thus luster decreases. Furthermore, when the ink is printed or applied by a gravure method or a screen printing method, fill-in of the plate may occur.

The method for preparing metal thin film fragments will now be described by way of a particularly preferable vapor deposition method as an example. As a substrate film on which metal is vapor-deposited, a polyolefin film, a polyester film or the like can be used. After a release layer is formed on a substrate film by application, metal is vapor-deposited on the release layer in a predetermined thickness. A top coat layer is formed on the vapor-deposited surface so as to prevent oxidation. The coating agent used to form the release layer may be the same as that used to form the top coat layer.

The resin used in the release layer and/or the top coat layer is not specifically limited. Specific examples thereof include cellulose derivative, acrylic resin, vinyl-based resin, polyamide, polyester, EVA resin, chlorinated polypropylene, chlorinated EVA resin and petroleum-based resin. As the solvent usable for the layers, for example, there can be used aromatic hydrocarbons such as toluene and xylene; aliphatic or alicyclic hydrocarbons such as n-hexane and cyclohexane; esters such as ethyl acetate and propyl acetate; alcohols such as methanol, ethanol and isopropyl alcohol; ketones such as acetone and methyl ethyl ketone; and alkylene glycol monoalkyl ethers such as ethylene glycol monoethyl ether and propylene glycol monomethyl ether.

The metal vapor-deposited film is removed from the substrate film by dipping in a solvent which dissolves the release layer and the top coat layer, followed by stirring. After stirring furthermore, the average particle diameter of the metal vapor-deposited thin film fragments is adjusted within a range from about 5 to 25 μm, and preferably from 10 to 15 μm, followed by filtration and further drying. The solvent is not specifically limited as far as it can dissolve the resin used in the release layer and/or the top coat layer.

The metal vapor-deposited thin film fragments are preferably subjected to a surface treatment so as to enhance dispersibility in the ink. Examples of the surface treating agent include organic fatty acids such as stearic acid, oleic acid and palmitic acid; and cellulose derivatives such as methylsilyl isocyanate, nitrocellulose, cellulose acetate propionate, cellulose acetate butyrate and ethyl cellulose.

(Binder Resin)

As the binder resin, a resin which has at least one group selected from a group consisting of a carboxyl group, a phosphoric acid group, a sulfonic acid group, metal salts thereof and an amino group can be used. The total content of the group in the binder resin is preferably within a range from about 50 to 500 mmol/kg, and more preferably from about 50 to 250 mmol/kg. Examples of the binder resin which can be preferably used include: polymerized resins wherein (meth) acrylic acid, maleic anhydride, fumaric acid and/or salts thereof, (meth)acryloyloxyethylsulfonyl sodium salt, dimethylaminopropyl (meth)acrylate and/or the like are used as a copolymer component, when the polymerized resins such as acrylic resin, vinyl chloride resin, vinylidene chloride resin, vinyl chloride-vinyl acetate resin, ethylene-vinyl acetate resin, polyolefin resin, chlorinated olefin resin and ethylene-acrylic resin, which can be used for paint, is formed; Condensation polymerized resins in which a 2,2-dimethylolpropionic acid, phthalic acid having a sulfonic acid group, diethanolaminoethylphosphoric acid, salts thereof and/or the like are used as a condensation component and as a portion of a polyol component and/or a polycarboxylic acid component, when condensation of condensation resins such as polyurethane resin (which may be amide-modified, urea-modified or epoxy-modified) and polyester resin (which may be amide-modified, urea-modified or epoxy-modified), which can be used for paint, is carried out; and those obtained by modifying a petroleum-based resin, an epoxy resin or a cellulose derivative resin with chloroacetic acid, bromoacetic acid, concentrated sulfuric acid or the like. Among these, an urethane resin having a carboxyl group or a sulfonic acid group, a vinyl chloride-vinyl acetate resin having a carboxyl group or a sulfonic acid group and an acrylic resin having a carboxyl group, a sulfonic acid group and the like are particularly preferable. As the binder resin of the decorative layer, a resin having a softening point lower than that of a synthetic resin film for molding, on which a decorative layer is formed, can be preferably used so as to sufficiently malleate the decorative layer in the molding step. It is more preferable that a difference in the softening point between the binder resins is 20° C. or higher. The use of these binder resins makes it possible to prevent the decorative layer in the laminated sheet from easily causing peeling due to cohesion.

(Acid Anhydride)

To the high-brightness ink of the present invention, an acid anhydride can be added so as to improve storage stability. Although the high-brightness ink of the present invention may cause increase of viscosity or gelation of the ink when stored for a too long period, it can be prevented by adding the acid anhydride. Examples of the acid anhydride include anhydride of monobasic acid, such as acetic anhydride; anhydride of dibasic acid, such as succinic anhydride, phthalic anhydride or tetrahydrophthalic anhydride; anhydride of tribasic acid, such as trimellitic anhydride; tetrabasic acid anhydride such as pyromellitic acid dianhydride and substituted compounds thereof. Among these acid anhydrides, anhydride of dibasic acid is preferable. The content of these acid anhydrides is preferably within a range from 0.01 to 30% by mass, more preferably from 0.1 to 20% by mass, and still more preferably from 1.0 to 15% by mass, in terms of an acid anhydride moiety, based on the metal thin film fragments in the high-brightness ink. When the content is less than 0.01%, the ink stabilizing effect is not exerted. On the other hand, when the content exceeds 30%, stability may deteriorates due to excess of the acid anhydride. As used herein, the acid anhydride moiety of the acid anhydride refers to a —C(=O)OC(=O)— group (molecular weight: 72).

(Additive)

In the high-brightness ink of the present invention, if necessary, there can be used various additives, which are used in a conventional gravure ink, flexo ink, screen ink, coating material or the like, for the purpose of defoaming, preventing sedimentation, dispersing pigments, modifying fluidity, preventing blocking, preventing electro static charge, preventing oxidation, absorbing ultraviolet light, internal crosslinking and the like. Examples of the additive include coloring pigments, dyes, waxed, plasticizers, leveling agents, surfactants, dispersing agents, defoamers, chelating agents and polyisocyanates.

(Solvent)

The high-brightness ink of the present invention is a solvent-including ink and there can be used conventionally known solvents which can be used in a conventional gravure ink, flexo ink, screen ink, coating material and the like. Specific examples of the solvent include aromatic hydrocarbons such as toluene and xylene; aliphatic or alicyclic hydrocarbons such as n-hexane and cyclohexane; esters such as ethyl acetate and propyl acetate; alcohols such as methanol, ethanol and isopropyl alcohol; ketones such as acetone, methyl ethyl ketone and methyl isobutyl ketone; alkylene glycol monoalkyl ethers such as ethylene glycol monoethyl ether and propylene glycol monomethyl ether; and acetate esters thereof.

(Method for Preparation of Ink)

The metal vapor-deposited thin film fragments which is mixed so as to enable the high-brightness ink of the present invention to exhibit mirror-like metallic luster have a thickness of 0.01 to 0.1 μm and an average particle size of 5 to 25 μm, and preferably have a thickness of 0.02 to 0.45 μm and an average particle diameter of 10 to 15 μm. When kneading is conducted, the metal vapor-deposited thin film fragments are converted into fine particles and mirror-like metallic luster drastically decreases. Therefore, in the high-brightness ink of the present invention, compounding materials comprising a binder resin, metal vapor-deposited thin film fragments and a solvent can be simply mixed in a mixer without kneading to prepare a high-brightness ink.

2. Laminated Sheet

The laminated sheet of the present invention is a laminated sheet comprising multilaminated at least two synthetic resin films for molding, and a decorative layer(s) having mirror-like metallic luster, which is formed with the high-brightness ink of the present invention and provided at any laminate interface between the synthetic resin films.

(Synthetic Resin Film for Molding)

The synthetic resin film for molding used in the present invention is a transparent or translucent, or colorant-containing, single- or multilayered film which has malleability. As used herein, transparent or translucent can also mean a transparent or translucent clear-colored case. The synthetic resin film(s) for molding which is positioned to at least one side of the decorative layer is preferably transparent or translucent.

When the molding step due to heat, such as vacuum molding, is required, a film containing a thermoplastic resin as a main component is preferably used. Examples of the thermoplastic resin which is suitably used include polyethylene, polypropylene, polyethylene terephthalate, polybutylene terephthalate, acrylic resin, silicone-acrylic resin, polystyrene, polyurethane, nylon, polyvinyl alcohol, ethylene-vinyl alcohol, polyvinyl chloride, polyvinylidene chloride, polyvinyl fluonate and polyvinylidene fluonate. The film to be used is preferably a film a having a softening point within a range from 60 to 300° C., more preferably from 70 to 220° C., and still more preferably from 80 to 190° C.

(Decorative Layer)

The decorative layer used in the laminated sheet of the present invention is a layer having mirror-like metallic luster, which is located at any laminate interface of multilaminated at least two synthetic resin films for molding, and comprises a film made of the high-brightness ink of the present invention. The thickness of film being within a range from 0.05 to 2.0 μm, preferably from 0.5 to 2.0 μm, and more preferably from 1.0 to 2.0 μm. When the thickness of the film is set to the value of less than 1 μm, the content of the metal thin film fragments in the film is preferably set within a range from 20 to 60% by mass.

(Printing or Coating Method)

Examples of the printing and coating method usable for forming the decorative layer of the laminated sheet of the present invention include printing methods such as gravure printing, flexo printing and screen printing methods; and coating methods using coaters such as gravure coater, gravure reverse coater, flexo coater, blanket coater, roll coater, knife coater, air knife coater, kiss-touch coater, kiss-touch reverse coater, comma coater, comma reverse coater and microgravure coater.

(Lamination)

On the decorative layer formed by the printing or coating method, a synthetic resin film(s) for molding, which can be selected from various synthetic resin films for molding described above, is further laminated. The lamination may be conducted with or without using an adhesive between the decorative layer and the synthetic resin film for molding. As the adhesive, a dry laminate adhesive, a wet laminate adhesive, a heat seal adhesive, a hot melt adhesive and the like can be preferably used. Although an adhesive layer may be used at the interface between the synthetic resin film for molding and the decorative layer as described above, it is possible to conduct thermal lamination without using a special adhesive layer. In this case, as the binder resin of the decorative layer, a resin having adhesion properties at a temperature within a range from normal temperature to about 60° C. may be used.

A film of a colorant-containing ink may be further laminated on the decorative layer having high-brightness mirror-like metallic luster, which comprises the high-brightness ink film containing the metal thin film fragments and the binder resin. A transparent varnish layer may be formed between the decorative layer and the film of the colorant-containing ink. Also an ink film similar to the decorative layer may be laminated on the decorative layer via a transparent varnish layer. Preferable examples of a binder resin for varnish usable in the colorant-containing ink include; thermoplastic resins such as acrylic resin, polyurethane resin, polyamide resin, urea resin, epoxy resin, polyester resin, vinyl resin, vinylidene resin, ethylene-vinyl acetate resin, polyolefin resin, chlorinated olefin resin, ethylene-acrylic resin, petroleum-based resin and cellulose derivative resin. For sufficient malleation of the decorative layer comprising the ink film, a resin having a softening point lower than that of the resin contained in the synthetic resin film for molding is preferable for the colorant-containing ink.

The dry thickness of the colorant-containing ink film which may be further laminated on the decorative layer is preferably within a range from about 0.05 to 100 μm, more preferably from about 0.5 to 30 μm, and still more preferably from about 0.5 to 15 μm. When the decorative layer comprises the colorant-containing ink film, it is possible to see colored high-brightness mirror-like metallic luster through the high-brightness ink film from the surface layer. In this case, the thickness of the decorative layer of the high-brightness ink of the present invention film is preferably about 1.0 μm or less, and more preferably about 0.05 or more and 0.7 μm or less, in view of permeability.

When the colorant-containing ink film, which is further laminated on the decorative layer, is made of an ink having the similar color as that of the ink used in the decorative layer having high-brightness mirror-like metallic luster, shielding properties can be imparted by the colorant-containing ink film.

(Adhesive)

The decorative layer may be plural layers via the synthetic resin film(s) for molding. In case of bonding at the interface between the decorative layer and the synthetic resin film for molding via an adhesive, a dry laminate adhesive, a wet laminate adhesive, a heat seal adhesive, a hot melt adhesive and the like are preferably used as the adhesive.

(Protective Layer)

In the laminated sheet of the present invention, at least one transparent, translucent or clear-colored top coat layer can be provided at the surface layer side of molding so as to impart performances such as design properties, abrasion resistance, scratch resistance, weatherability, contamination resistance, water resistance, chemical resistance, heat resistance and the like. As a top coat agent, a lacquer type top coat agent, a crosslinking type top coat agent including isocyanate, epoxy or the like, and a UV crosslinking type or EB crosslinking type top coat agent can be preferably used as far as malleability of the laminated sheet is not adversely affected.

(Colored Clear Layer)

In order to impart design properties and/or to improve adhesion, a transparent or translucent clear-colored layer can be formed between the transparent or translucent synthetic resin film for molding and the decorative layer.

(Applications)

The laminated sheet of the present invention can be used as a surface layer for various molding methods. For example, molding can be conducted by an insert injection molding method comprising the steps of disposing a transparent or translucent synthetic resin film for molding of a laminated sheet at the surface side, molding the sheet into a premolded article having a three-dimensional shape through thermal molding, inserting the resulting premolded article into a mold for injection molding and integrating with an injected resin. Furthermore, the laminated sheet can be used for molding by an in-mold injection molding comprising the steps of inserting a laminated sheet into a mold for injection molding while the sheet form of the laminated sheet is maintained, and integrating with an injected resin in the mold. Because of excellent malleability of the laminated sheet of the present invention, it is possible to maintain design properties even at the position with large degree of malleation, namely, it is possible to maintain high mirror-like metallic luster.

(Malleability)

Malleability is defined as follows using a change rate of a surface luster value. Molding using a laminated sheet is conducted at the temperature higher than that of a softening point of the material constituting the laminated sheet. Then, the thickness of each portions of the laminated sheet after molding is measured, and the surface luster values of the portion having the same thickness as that of the laminated sheet before molding (non-malleated portion) and of the portion having half of the thickness of the laminated sheet before molding (200% malleated portion) are measured under the conditions of 60°/60° from the surface side of a transparent or translucent resin film for molding of the laminated sheet using a glossmeter: MICRO-TRI-GLOSS (manufactured by BYK-Gardner). The change rate of the surface luster value is defined as follows.

Change rate of surface luster value=(luster value of non-malleated portion−luster value of 200% malleated portion)/(luster value of non-malleated portion)×100 (%)

The change rate of surface luster value evaluated from the side of the transparent or translucent synthetic resin film for molding regarding 200% malleation can be used as an indicator of malleability of the laminated sheet of the present invention. The change rate is preferably 20% or less, and particularly preferably 10% or less.

EXAMPLES

The present invention will now be described in detail by way of examples, but is not limited thereto. In the following examples, parts and percentages are by mass unless otherwise specified.

Examples of High-Brightness Ink (Preparation of Inks for Examples and Comparative Examples)

Under the following conditions, aluminum thin film fragments and an aluminum thin film fragment slurry were prepared.

(Aluminum Thin Film Fragments)

Nitrocellulose (HIG7) was dissolved in a solvent mixture of ethyl acetate and isopropyl alcohol (a mixing ratio was 6:4) to obtain a 6% solution. The solution was applied on a polyester film using a Gravure cylinder having screen ruling of 175 line/in and a cell depth of 25 μm to form a release layer. After sufficient drying, an aluminum was vapor-deposited on the release layer in the thickness of 0.04 μm. On the surface of the vapor-deposited film, the same nitrocellulose solution as that used in the release layer was applied under the same conditions as those in case of the release layer to form a top coat layer.

The formed vapor-deposited film was dipped in a solvent mixture of ethyl acetate and isopropyl alcohol (a mixing ratio was 6:4) to remove the aluminum vapor-deposited film from the polyester film. Then, the aluminum vapor-deposited film was ground using a stirrer to obtain aluminum thin film fragments having a size of about 150 μm.

(Aluminum Thin Film Fragments Slurry)

| Aluminum thin film fragments | 10 Parts |
| Ethyl acetate | 35 Parts |
| Methyl ethyl ketone | 30 Parts |
| Isopropyl alcohol | 30 Parts |

The above components were mixed and 5 parts of a nitrocellulose solution having the following composition was added with stirring.

| Nitrocellulose (HIG1/4) | 25% |
| Solvent mixture of ethyl acetate and isopropyl alcohol in a mixing ratio of 6:4 | 75% |

While maintaining the temperature at 35° C. or lower, the mixture was stirred so as to adjust an average particle diameter of aluminum thin film fragments to the value within a range from 5 to 25 μm using a turbo mixer to prepare an aluminum thin film fragments slurry (non-volatile component: 10%).

(1) Ink 1

| | |
|---|---|
| Aluminum thin film fragments slurry (non-volatile component: 10%) | 30 Parts |
| Binder resin:<br>Carboxyl group-containing vinyl chloride-vinyl acetate resin (VINILIGHT VMCH, manufactured by UCC Co., concentration of carboxyl group: 204 mmol/kg) | 3 Parts |
| Urethane resin ("POLYURETHANE 2593" manufactured by Arakawa Chemical Industries, Ltd., non-volatile component: 32%) | 8 Parts |
| Ethyl acetate | 23 Parts |
| Methyl ethyl ketone | 26 Parts |
| Isopropanol | 10 Parts |

The above components were mixed to prepare an ink 1 in which the concentration of aluminum thin film fragments in the non-volatile component is 35% by mass.

(2) Ink 1-A

100 Parts of the aforementioned ink 1 of Example was mixed with 1 part (content of acid anhydride moiety: 55%, 18.3% based on aluminum thin film fragments in ink) of Epicron B-4400 manufactured by Dainippon Ink AND Chemicals Incorporated to prepare an ink 1-A containing an acid anhydride.

(3) Ink 2

| | |
|---|---|
| The aforementioned aluminum thin film fragments slurry (non-volatile component: 10%) | 30 Parts |
| Binder resin:<br>Carboxyl group-containing urethane resin (TYFORCE (registered trademark), manufactured by Dainippon Ink AND Chemicals Incorporated, article number: NT-810-45 (non-volatile component: 45%), concentration of carboxyl group: 239 mmol/kg) | 12 Parts |
| Ethyl acetate | 28 Parts |
| Methyl ethyl ketone | 20 Parts |
| Isopropanol | 10 Parts |

The above components were mixed to prepare an ink 2 in which the concentration of aluminum thin film fragments in the non-volatile component is 35% by mass.

(4) Ink 2-A

100 Parts of the ink 2 was mixed with 0.5 parts (6.3% based on aluminum thin film fragments in ink, content of acid anhydride moiety: 37.5%) of trimellitic anhydride to prepare an ink 2-A containing an acid anhydride.

(5) Ink 2-B

100 Parts of the ink 2 was mixed with 0.04 parts (0.37% based on aluminum thin film fragments in ink, content of acid anhydride moiety: 28%) of dodecenylsuccinic anhydride to prepare an ink 2-B containing an acid anhydride.

(6) Ink 3

| | |
|---|---|
| Aluminum thin film fragments slurry (non-volatile component: 10%) | 30 Parts |
| Binder resin:<br>Sulfonic acid-containing urethane resin (E-760, manufactured by Takeda Pharmaceutical Company Limited, non-volatile component: 30%, concentration of sulfonic acid group: 100 mmol/kg) | 18 Parts |
| Ethyl acetate | 12 Parts |
| Methyl ethyl ketone | 40 Parts |

The above components were mixed to prepare an ink 3 in which the concentration of aluminum thin film fragments in the non-volatile component is 35% by mass.

(7) Ink 4

| | |
|---|---|
| Aluminum thin film fragments slurry (non-volatile component: 10%) | 30 Parts |
| Binder resin:<br>Hydroxyl group-containing vinyl-chloride-vinyl acetate resin (VINILIGHT VAGH, manufactured by UCC Co.) | 3 Parts |
| Urethane resin ("Polyurethane 2593" manufactured by Arakawa Chemical Industries, Ltd., non-volatile component: 32%) | 8 Parts |
| Ethyl acetate | 28 Parts |
| Methyl ethyl ketone | 21 Parts |
| Isopropanol | 10 Parts |

The above components were mixed to prepare an ink 4 in which the concentration of aluminum thin film fragments in the non-volatile component is 35% by mass.

(8) Ink 5

| | |
|---|---|
| Aluminum paste (non-volatile component: 13%) (HIGH PRINT TD-200T, manufactured by TOYO ALUMINIUM K.K.) | 25 Parts |
| Urethane resin (POLYURETHANE 2593, manufactured by Arakawa Chemical Industries, Ltd.) | 20 Parts |
| Ethyl acetate | 27 Parts |
| Methyl ethyl ketone | 18 Parts |
| Isopropanol | 10 Parts |

The above components were mixed to prepare an ink 5 in which the concentration of aluminum thin film fragments in the non-volatile component is 35% by mass.

Preparation Example of Adhesive D-1

A two component adhesive (hereinafter referred to as an adhesive D-1) comprising 100 parts of an aromatic polyetherurethane resin (DICDRY (registered trademark), article number: AS-106A, manufactured by Dainippon Ink AND Chemicals Incorporated) as a main component and 10 parts of an epoxy (LR-100, manufactured by Dainippon Ink AND Chemicals Incorporated) as a curing agent was obtained.

As a synthetic resin film for molding for evaluation of an ink, a rubber-modified PMMA film (hereinafter referred to as a film A) which is transparent and has a surface luster value of 150 (60°/60°) and a thickness of 100 μm, and a gray and opaque 300 μm thick ABS film (hereinafter referred to as a film C) were used.

Example 1

The layer constitution of film A/ink 1/adhesive D-1/film C was prepared such that the ink 1 was applied once in a dry thickness of 2.0 μm using a gravure coater and the adhesive D-1 was applied in a coating weight of 5.0 g/m² using a gravure coater. The resulting sheet was aged at 40° C. for 3 days, and then the surface luster value and the peel strength were measured. The surface luster value was measured under the conditions of 60°/60° using a glossmeter: MICRO-TRI-GLOSS (manufactured by BYK-Gardner). The peel strength (N/in) was measured by T-peeling of a film A and a film C. The results are shown in Table 1.

Example 2

In the same manner as in Example 1, except that the ink 1 in Example 1 was replaced by the ink 2, the surface luster value and the peel strength were measured.

Example 3

In the same manner as in Example 1, except that the ink 1 in Example 1 was replaced by the ink 3, the surface luster value and the peel strength were measured.

Example 4

In the same manner as in Example 1, except that the ink 1 in Example 1 was replaced by the ink 1-A, the surface luster value and the peel strength were measured.

Example 5

In the same manner as in Example 1, except that the ink 1 in Example 1 was replaced by the ink 2-A, the surface luster value and the peel strength were measured.

Example 6

In the same manner as in Example 1, except that the ink 1 in Example 1 was replaced by the ink 2-B, the surface luster value and the peel strength were measured.

Comparative Example 1

In the same manner as in Example 1, except that the ink 1 in Example 1 was replaced by the ink 4, the surface luster value and the peel strength were measured.

Comparative Example 2

In the same manner as in Example 1, except that the ink 1 in Example 1 was replaced by the ink 5, the surface luster value and the peel strength were measured.

With respect to the respective inks of Examples and Comparative Examples, each residual ink after used for gravure coating was stored in a sealed constant temperature bath at 40° C. for one week and the state of the ink was examined. The viscosity was determined by measuring the time in seconds required for dropping an ink at room temperature of 23° C. using a Zahn cup No. 3 manufactured by RIGO Co., Ltd. The results are shown in Table 1.

Examples of Laminated Sheet (Production of Aluminum Vapor-Deposited Film)
An acrylic vapor deposition anchor agent (MET No. 1850, manufactured by Dainippon Ink AND Chemicals Incorporated) was applied on a rubber-modified PMMA film (film A) in a dry thickness of 1.0 μm using a gravure coater and then aluminum was vapor-deposited on the coated surface in a thickness of 0.06 μm.

(Preparation of Transparent Varnish)
50 Parts of an urethane resin (POLYURETHANE 2593, manufactured by Arakawa Chemical Industries, Ltd.), 30 parts of ethyl acetate, 20 parts of methyl ethyl ketone and 10 parts of ethyl acetate were mixed to obtain a transparent varnish.

In the same manner as in the evaluation of the ink, a laminated sheet was produced according to the following layer constitutions using a rubber-modified PMMA film (hereinafter referred to as a film A) which is transparent and has a surface luster value of 150 (60°/60°) and a thickness of 100 μm, and a gray and opaque 300 μm thick ABS film (hereinafter referred to as a film C) as a synthetic resin film for molding, and then the surface luster values of the non-malleated portion and the 200% malleated portion were measured.

Example 7

The layer constitution of film A/ink 1/adhesive D-1/film C was prepared such that an ink 1 was applied once in a dry thickness of 2.0 μm using a gravure coater and an adhesive D-1 was applied in a coating weight of 5.0 g/m² using a gravure coater. The resulting laminated sheet was aged at 40° C. for 3 days and molded by a vacuum molding method. The laminated sheet was molded so that the bottom portion is not malleated and the side portion is malleated (200%) using a trapezoidal testing mold in which the bottom face is composed of a square having a side length of 5 cm, an aperture face is composed of a square having a side length of 7 cm and an edge length of the side face is 2 cm.

In the molding, the laminated sheet was molded by a vacuum molding method under the conditions of a sheet temperature of 155° C. and a mold temperature of 60 to 80° C.

Example 8

In the same manner as in Example 7, except that the ink 1 in Example 7 was replaced by the ink 2, a laminated sheet was produced and molded.

TABLE 1

|  | Ink | Surface luster value | Interlaminar peel strength (N/in) | Viscosity upon preparation | Viscosity after aging at 40° C. for 7 days |
|---|---|---|---|---|---|
| Example 1 | Ink 1 | 151 | 6.0 | 19 | gelled |
| Example 2 | Ink 2 | 150 | 7.4 | 21 | 106 |
| Example 3 | Ink 3 | 150 | 6.2 | 20 | 96 |
| Example 4 | Ink 1-A | 150 | 6.0 | 19 | 20 |
| Example 5 | Ink 2-A | 150 | 7.4 | 21 | 22 |
| Example 6 | Ink 2-B | 151 | 8.3 | 21 | 24 |
| Comparative Example 1 | Ink 4 | 150 | 0.4 | 18 | 19 |
| Comparative Example 2 | Ink 5 | 90 | 16.7 | 17 | 18 |

Example 9

In the same manner as in Example 7, except that the ink 1 in Example 7 was replaced by the ink 3, a laminated sheet was produced and molded.

Example 10

The layer constitution of film A/ink 1/varnish/ink 1/adhesive D-1/film C was prepared such that any ink 1 was applied in a dry thickness of 2.0 μm using a gravure coater, the varnish was applied in a dry thickness of 4.0 μm using a gravure coater, and the adhesive D-1 was applied in a dry coating weight of 5.0 g/m² using a gravure coater. In the same manner as in Example 7, the resulting laminated sheet was molded.

Example 11

The layer constitution comprising film A/ink 2/adhesive D-1/film A/ink 2/adhesive D-1/film C was prepared such that any ink 2 was applied in a dry thickness of 2.0 μm using a gravure coater and the adhesive D-1 was applied in a dry coating weight of 5.0 g/m² using a gravure coater. In the same manner as in Example 7, the resulting laminated sheet was molded.

Example 12

In the same manner as in Example 7, except that the ink 1 in Example 7 was replaced by the ink 1-A, a laminated sheet was produced and molded.

Example 13

In the same manner as in Example 7, except that the ink 1 in Example 7 was replaced by the ink 2-A, a laminated sheet was produced and molded.

Example 14

In the same manner as in Example 10, except that the ink 1 was replaced by the ink 1-A, a laminated sheet was produced according to the layer constitution of Example 10 and molded.

Example 15

The layer constitution of film A/ink 2-B/adhesive D-1/film A/ink 2-A/adhesive D-1/film C was prepared such that the ink 2-B and the ink 2-A were applied in a dry thickness of 2.0 μm using a gravure coater and the adhesive D-1 was applied in a dry coating weight of 5.0 g/m² using a gravure coater. In the same manner as in Example 7, the resulting laminated sheet was molded.

Comparative Example 3

In the same manner as in Example 7, except that the ink 1 in Example 7 was replaced by the ink 4, a laminated sheet was produced and molded.

Comparative Example 4

In the same manner as in Example 7, except that the ink 1 in Example 7 was replaced by the ink 5, a laminated sheet was produced and molded.

Comparative Example 5

The layer constitution of aluminum vapor-deposited film/adhesive D-1/film C was prepared such that the adhesive D-1 was applied in a dry coating weight of 5.0 g/m² using a gravure coater. In the same manner as in Example 7, the resulting laminated sheet was molded.

After molding, the surface luster values of the portion having the same thickness as that of the laminated sheet before molding (non-malleated portion) and of the portion having half of the thickness of the laminated sheet before molding (200% malleated portion) were measured under the conditions of 60°/60° using a glossmeter: MICRO-TRI-GLOSS (manufactured by BYK-Gardner). The evaluation results of the laminated sheet are shown in Table 2.

TABLE 2

|   | Luster value of non-malleated portion | Luster value of 200% malleated portion | Change rate (%) |
|---|---|---|---|
| Example 7 | 151 | 146 | 3 |
| Example 8 | 150 | 145 | 3 |
| Example 9 | 150 | 146 | 3 |
| Example 10 | 149 | 144 | 3 |
| Example 11 | 150 | 145 | 3 |
| Example 12 | 150 | 145 | 3 |
| Example 13 | 150 | 145 | 3 |
| Example 14 | 149 | 144 | 3 |
| Example 15 | 151 | 146 | 3 |
| Comparative Example 3 | 150 | 145 | 3 |
| Comparative Example 4 | 90 | 70 | 22 |
| Comparative Example 5 | 300 | Impossible to measure | — |

"Impossible to measure" in Table 2 means that it is impossible to measure because breakage of a coating film of an aluminum vapor-deposited layer occurred.

INDUSTRIAL APPLICABILITY

The present invention can provide a high-brightness ink which imparts high-brightness mirror-like metallic luster for the printed surface and also has high peel strength. Also the present invention can provide an excellent laminated sheet which has high-brightness mirror-like metallic luster and also causes less change in luster during molding.

The invention claimed is:
1. An ink comprising: metal thin film fragments having an average thickness of 0.01 to 0.1 gm and an average particle diameter of 5 to 25 μm; and a binder resin having 50 to 500 mmol/kg of at least one selected from the group consisting of a carboxyl group, a phosphoric acid group, a sulfonic acid group and metal salts thereof; wherein the binder resin is selected from the group consisting of
    a. a vinyl chloride resin, a vinylidene chloride resin, a vinyl chloride-vinyl acetate resin, a ethylene-vinyl acetate resin, a polyolefin resin, a chlorinated olefin resin, or an ethylene-acrylic resin wherein the vinyl chloride resin, the vinylidene chloride resin, the vinyl chloride-vinyl acetate resin, the ethylene-vinyl acetate resin, the polyolefin resin, the chlorinated olefin resin, and the ethylene-acrylic resin contain maleic anhydride, fumaric acid or salts thereof;
    b. a petroleum-based resin, an epoxy resin, or a cellulose derivative resin, wherein the petroleum-based resin, the epoxy resin, and the cellulose derivative resin are modified with chloroacetic acid, bromoacetic acid, or sulfuric acid; or c. a polyurethane resin, an amide-modified polyurethane resin, a urea-modified polyurethane resin, an epoxy-modified polyurethane resin, a polyester resin, an amide-modified polyester resin, a urea-modified polyester resin, or an epoxy-modified polyester resin, wherein the polyurethane resin, the amide-modified polyurethane resin, the urea-modified polyurethane resin, the epoxy-modified polyurethane resin, the polyester resin, the amide-modified polyester resin, the urea-modified polyester resin, and the epoxy-modified polyester resin is obtained by condensation of a polyol and/or a polycarboxylic acid and 2,2-dimethylolpropionic acid, phthalic acid having a sulfonic acid group, diethanolaminoethylphosphoric acid, or salts thereof.

2. The ink according to claim 1, wherein the content of the metal thin film fragments is from 10 to 60% by mass based on a non-volatile component in the ink.

3. The ink according to claim 1, wherein the metal thin film fragments are obtained from a metal thin film which is obtained by at least one method selected from the group consisting of sputtering, malleation and aluminum vapor deposition.

4. The ink according to claim 1, wherein the metal thin film fragments are fragments obtained from a thin film made of metal.

5. The ink according to claim 1, wherein the metal thin film fragments are fragments obtained from a vapor-deposited metal thin film.

6. The ink according to claim 1, wherein the metal thin film fragments have an average thickness of 0.01 to 0.08 μm.

7. The ink according to claim 1, wherein the content of the carboxyl group, the phosphoric acid group, sulfonic acid group, or metal salts thereof is 50 to 250 mmol/kg.

8. The ink according to claim 1, which contains no water.

9. The ink according to claim 8, which contains an acid anhydride.

10. The ink according to claim 9, wherein the ink contains 0.01 to 30% by mass of an acid anhydride moiety as a —C(=O)OC(=O)— group in the acid anhydride based on the metal thin film fragments.

11. An ink comprising: metal thin film fragments having an average thickness of 0.01 to 0.1 μm and an average particle diameter of 5 to 25 μm; a binder resin having 50 to 500 mmol/kg of at least one selected from the group consisting of a carboxyl group, a phosphoric acid group, a sulfonic acid group and metal salts thereof; and 0.01 to 30% by mass, based on the metal thin film fragments, of an acid anhydride moiety as a —C(=O)OC(=O)— group in an acid anhydride, wherein the acid anhydride is an anhydride selected from the group consisting of anhydride of monobasic acid, an anhydride of dibasic acid, an anhydride of a tribasic acid, anhydride of tetrabasic acid, and substituted anhydrides thereof.

12. The ink according to claim 11, wherein the metal thin film fragments are obtained from a thin film made of metal.

13. The ink according to claim 11, wherein the metal thin film fragments are obtained from a vapor-deposited metal thin film.

14. The ink according to claim 11, wherein the metal thin film fragments have an average thickness of 0.01 to 0.08 μm.

15. The ink according to claim 11, wherein the content of the carboxyl group, the phosphoric acid group, sulfonic acid group, or metal salts thereof in the binder resin is 50 to 250 mmol/kg.

16. A laminated sheet comprising: at least two synthetic resin films for molding, a decorative layer having a metallic luster at a laminate interface of the synthetic resin films and wherein the decorative layer is an ink film formed by the ink composition of claim 1.

17. The laminated sheet according to claim 16, wherein one or more of the synthetic resin films provided on at least one side of the decorative layer are transparent or translucent.

18. The laminated sheet according to claim 16, wherein the two or more synthetic resin films contain a thermoplastic resin.

19. The laminated sheet according to claim 16, wherein the synthetic resin films contain a thermoplastic resin and a softening point of the binder resin of the decorative layer is lower than that of the thermoplastic resin.

20. The laminated sheet according to claim 16, further comprising an adhesive layer at an interface between the at least two synthetic resin films and the decorative layer.

21. The laminated sheet according to claim 16, wherein one or more of the synthetic resin films is transparent or translucent and wherein a change rate of a surface luster value of the transparent or translucent synthetic resin film is 20% or less at 200% malleation.

22. The laminate sheet according to claim 16, wherein the ink contains no water.

23. The laminated sheet according to claim 16, wherein the content of the metal thin film fragments is from 10 to 60% by mass based on a non-volatile component in the ink.

24. A laminated sheet comprising: at least two synthetic resin films for molding, a decorative layer having a metallic luster at a laminate interface of the synthetic resin films and wherein the decorative layer is an ink film formed by the ink composition of claim 11.

* * * * *